(12) United States Patent
Zettel

(10) Patent No.: US 7,726,052 B2
(45) Date of Patent: Jun. 1, 2010

(54) FARM IMPLEMENT

(76) Inventor: Daniel M. Zettel, 3058 Green Rd., West Branch, MI (US) 48661

( * ) Notice: Subject to any disclaimer, the term of this patent is extended or adjusted under 35 U.S.C. 154(b) by 0 days.

(21) Appl. No.: 12/171,503

(22) Filed: Jul. 11, 2008

(65) Prior Publication Data

US 2009/0013565 A1 Jan. 15, 2009

Related U.S. Application Data

(60) Provisional application No. 60/959,125, filed on Jul. 11, 2007.

(51) Int. Cl.
*E02F 3/96* (2006.01)
(52) U.S. Cl. .................................. 37/405; 414/724
(58) Field of Classification Search ................ 172/439, 172/245–253; 37/403–407, 468, 444, 903; 414/723, 724, 681, 912
See application file for complete search history.

(56) References Cited

U.S. PATENT DOCUMENTS

| | | | | |
|---|---|---|---|---|
| 3,362,554 | A | * | 1/1968 | Fortier ........................ 414/703 |
| 3,389,819 | A | | 6/1968 | Schumacher |
| 3,561,788 | A | | 2/1971 | Carlson |
| 3,985,249 | A | | 10/1976 | Aker et al. |
| 4,030,624 | A | | 6/1977 | Matthews |
| 4,106,645 | A | | 8/1978 | Janish |
| 4,175,900 | A | * | 11/1979 | Etzler ........................ 414/787 |
| 4,253,793 | A | | 3/1981 | Braml |
| 4,625,988 | A | | 12/1986 | Witchey et al. |
| 4,871,292 | A | | 10/1989 | Milanowski |
| 5,026,247 | A | | 6/1991 | Zimmerman |
| 5,064,338 | A | * | 11/1991 | Lawrence ................... 414/685 |
| 5,075,985 | A | | 12/1991 | Mensch |
| 5,098,252 | A | | 3/1992 | Sheesley et al. |
| 5,107,610 | A | | 4/1992 | Fusco |
| 5,178,511 | A | * | 1/1993 | Wedin ........................ 414/703 |
| 5,310,275 | A | | 5/1994 | Lovitt |
| 5,350,250 | A | | 9/1994 | Nagler |
| 5,515,625 | A | * | 5/1996 | Keigley ........................ 37/405 |
| 5,732,488 | A | | 3/1998 | Smith |
| 6,092,606 | A | * | 7/2000 | Basler ........................ 171/63 |
| 6,148,928 | A | | 11/2000 | Spears |
| 6,293,351 | B1 | | 9/2001 | Schmidt |
| 6,308,440 | B1 | | 10/2001 | Mueller |
| 6,386,569 | B1 | | 5/2002 | Wick |

(Continued)

OTHER PUBLICATIONS

3 Point Hitch Adapters—Berlon Industries http://web.archive.org/web/20021021144323/www.berlon.com/fattachments.html.

(Continued)

*Primary Examiner*—Robert E Pezzuto
(74) *Attorney, Agent, or Firm*—Harness, Dickey & Pierce, P.L.C.

(57) ABSTRACT

A tined implement coupled to front arms of a front end loader includes a hitch quick-coupler mechanism, a body, at least one tine and a plurality of arm coupling brackets. The body is coupled to the quick-coupler mechanism and defines a plurality of apertures each having tine bearing surfaces. The at least one tine is coupled to the body and positioned within one of the tine bearing surfaces. The plurality of arm coupling brackets are coupled to the quick-coupler mechanism. The brackets are rotatably coupled to the front arms of the front end loader.

17 Claims, 15 Drawing Sheets

U.S. PATENT DOCUMENTS 6,390,765 B1 5/2002 Dick
6,408,550 B1 * 6/2002 Allsopp et al. ................. 37/405
6,499,934 B1 12/2002 Kaczmarski et al.
7,073,972 B1 7/2006 Schumacher
7,108,475 B1 * 9/2006 Gustafson ................... 414/723

OTHER PUBLICATIONS

MPUF Mounts—Berlon Industries http://www.berlon.com/muniversal.php.

* cited by examiner

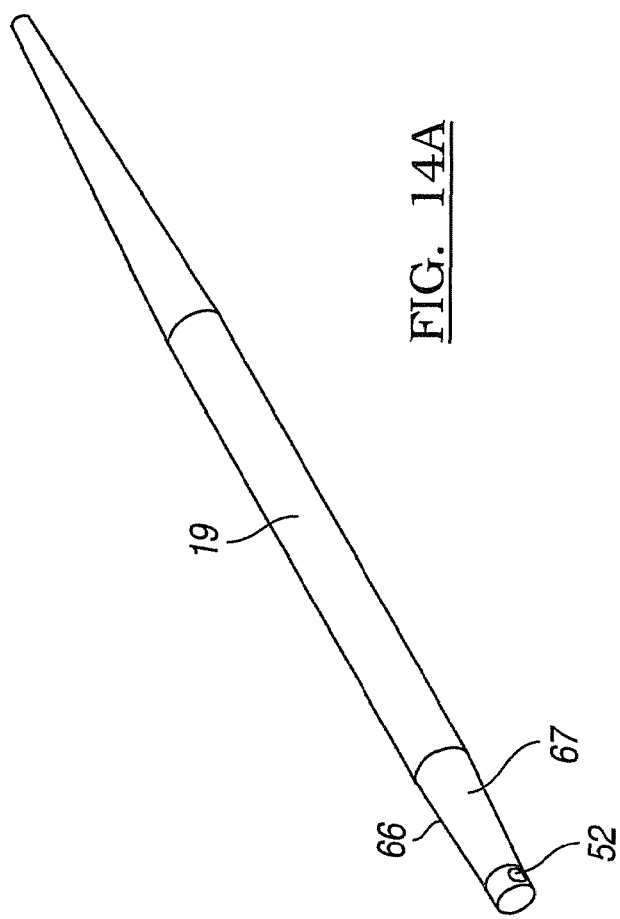
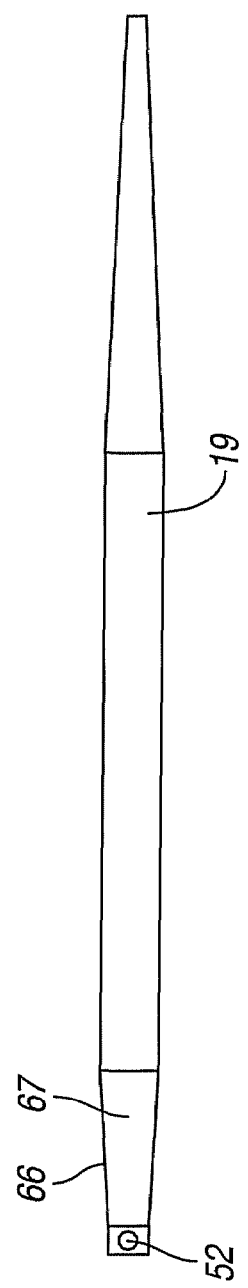
FIG. 14A
FIG. 14B

FARM IMPLEMENT

CROSS-REFERENCE TO RELATED APPLICATIONS

This application claims the benefit of U.S. Provisional Application No. 60/959,125, filed on Jul. 11, 2007. The disclosure of the above application is incorporated herein by reference.

FIELD

The present disclosure relates generally to a tined farm implement and, more particularly, to a farm implement having selectively positionable tines with a mount apparatus for attaching a tined implement to front loader arms of a front-end loader.

BACKGROUND

The statements in this section merely provide background information related to the present disclosure and may not constitute prior art.

Typically, implements, such as landscape rakes, augers and various blades are arranged to be pulled behind a tractor by attaching the implements to a rear end of a tractor via a three-point hitch. To facilitate attaching the implements to the three-point hitch, commonly a quick-hitch apparatus is attached to a pair of outer or draft links and an upper center link of the three-point hitch. The quick-hitch apparatus has hooks adapted for quick attachment to three-point hitch attachment locations on the implement. Unfortunately, this configuration does not allow for the easy manipulation of the implement once coupled to the tractor.

Additionally, these implements typically have fixed specialized hardware with very defined uses. While it is sometimes possible to use one implement for several tasks, the nature of the farming industry requires safety, flexibility, and efficiency. These requirements lead equipment users to purchase multiple implements for use with their tractors.

SUMMARY

To overcome the deficiencies of the prior art, a mounting apparatus and a tined implement attached to the front arms of a front-end loader are provided. The mounting apparatus has a bracket disposed between the front arms of the front arm loader and the quick-coupler mechanism. In this regard, the bracket provides four mounting points for rotational coupling to a pair of control link arms and lower arms. The tined implement has a plurality of selectively re-configurable tines.

In one embodiment, a mounting apparatus is provided which is adapted for direct attachment to a tined implement. The apparatus has a generally planar body which is coupled to a quick attach face plate having a pair of flanges extending laterally from the body. Each flange defines a pair of openings adapted for pivotal attachments to a front arm of a front arm loader. The front arms each have top and bottom arms. The brackets are rotationally coupled to the top and bottom arms to form a four-bar linkage.

Further disclosed is a method for attaching a tined implement to a pair of control link arms and front loader arms of a front-end loader. A quick attach face plate is attached to the control link arms via a pair of generally parallel flanges. Further areas of applicability will become apparent from the description provided herein. It should be understood that the description and specific examples are intended for purposes of illustration only and are not intended to limit the scope of the present disclosure.

DRAWINGS

Some of the objects, features and advantages of the invention will become readily apparent in view of the following detailed description of presently preferred embodiments and best mode, appended claims, and accompanying drawings, in which:

in FIG. 13, only the arms of the farm equipment and the mounting apparatus are shown;

FIGS. 14a and 14b represent perspective and side views of a tine shown in FIGS. 1-11.

DETAILED DESCRIPTION

The following description is merely exemplary in nature and is not intended to limit the present disclosure, application, or uses.

Figure 1:
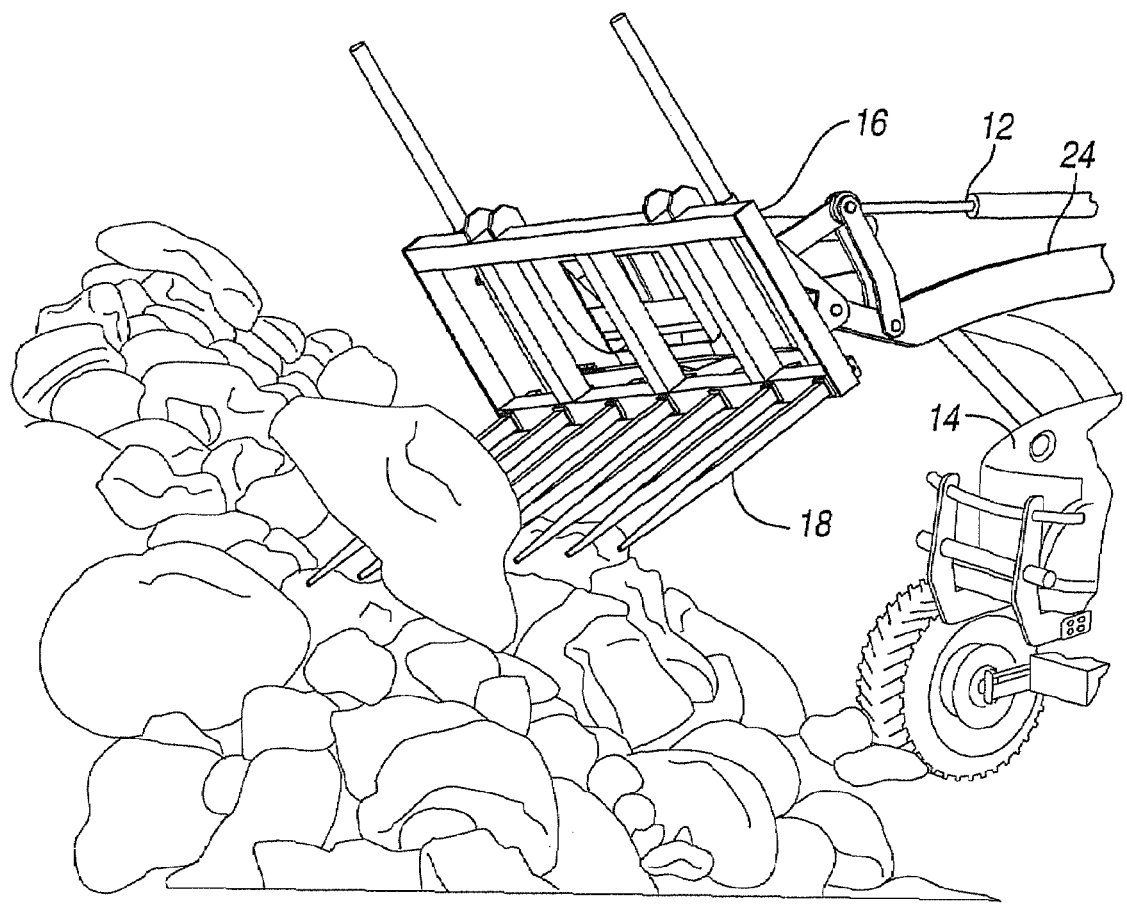
FIG. 1 is a perspective view of a tined implement constructed according to one embodiment attached to a pair of front loader arms of a front-end loader.
Figure 2:
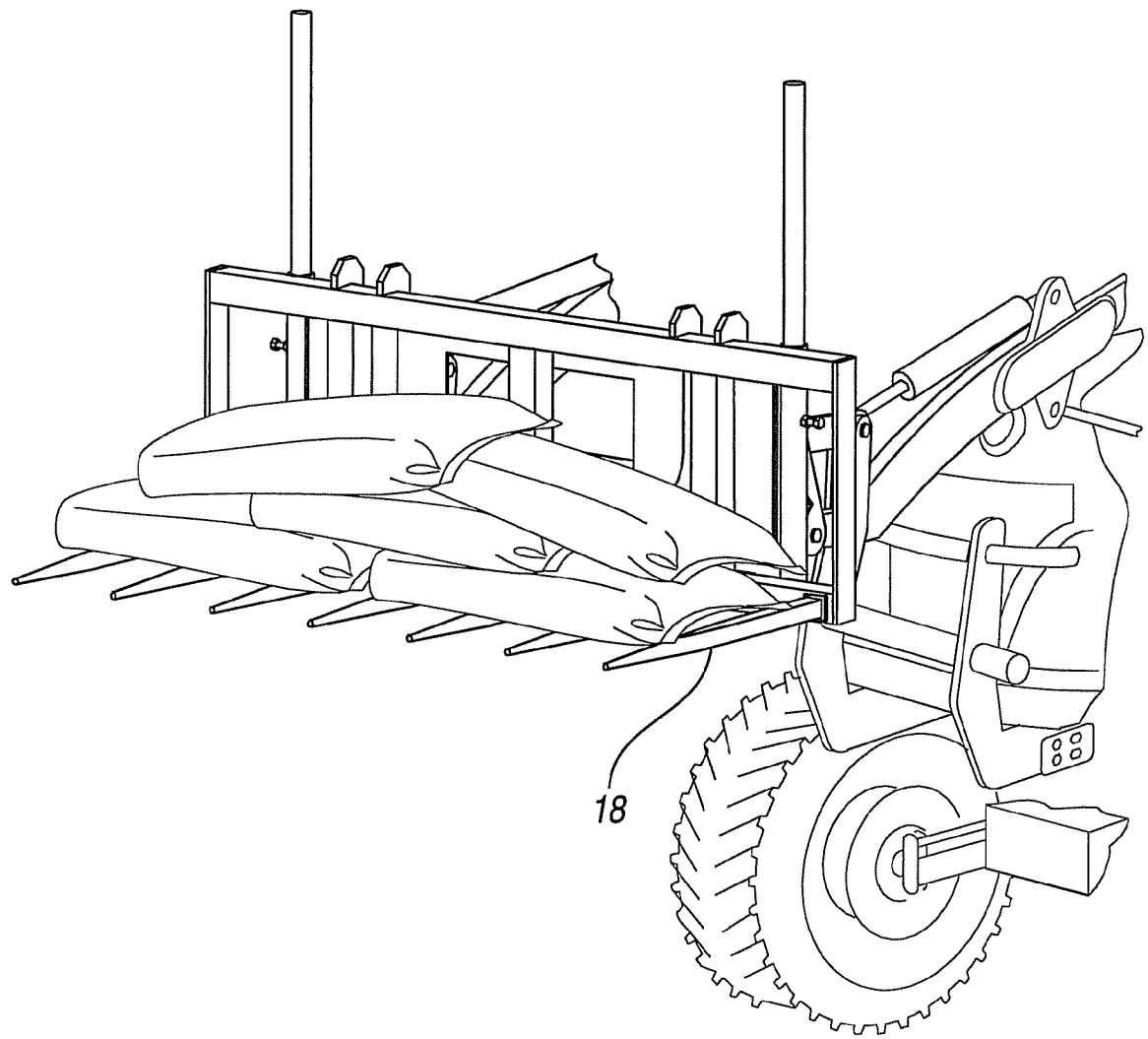
FIGS. 2-5 represent front and side views of the use of the tined implement shown in FIG. 1.

Referring in more detail to the drawings, FIG. 1 illustrates a tined implement 16 constructed according to one embodiment attached to front loader arms of a transporting vehicle, represented here as a front loader arm assembly of a front-end loader 14. As shown in FIGS. 2-5, a tined implement 16 can be directly attached to the loader arm assembly 12 to facilitate supporting material. Methods for coupling the implement 16 to the front-end loader 14 are described in co-pending Patent Application PCT/US06/042719 entitled "Mount Apparatus and Method for Attaching Three-Point Hitch Implements to Front Arms of a Front End Loader," filed Oct. 31, 2006, which is incorporated in its entirety by reference.

Figure 3:
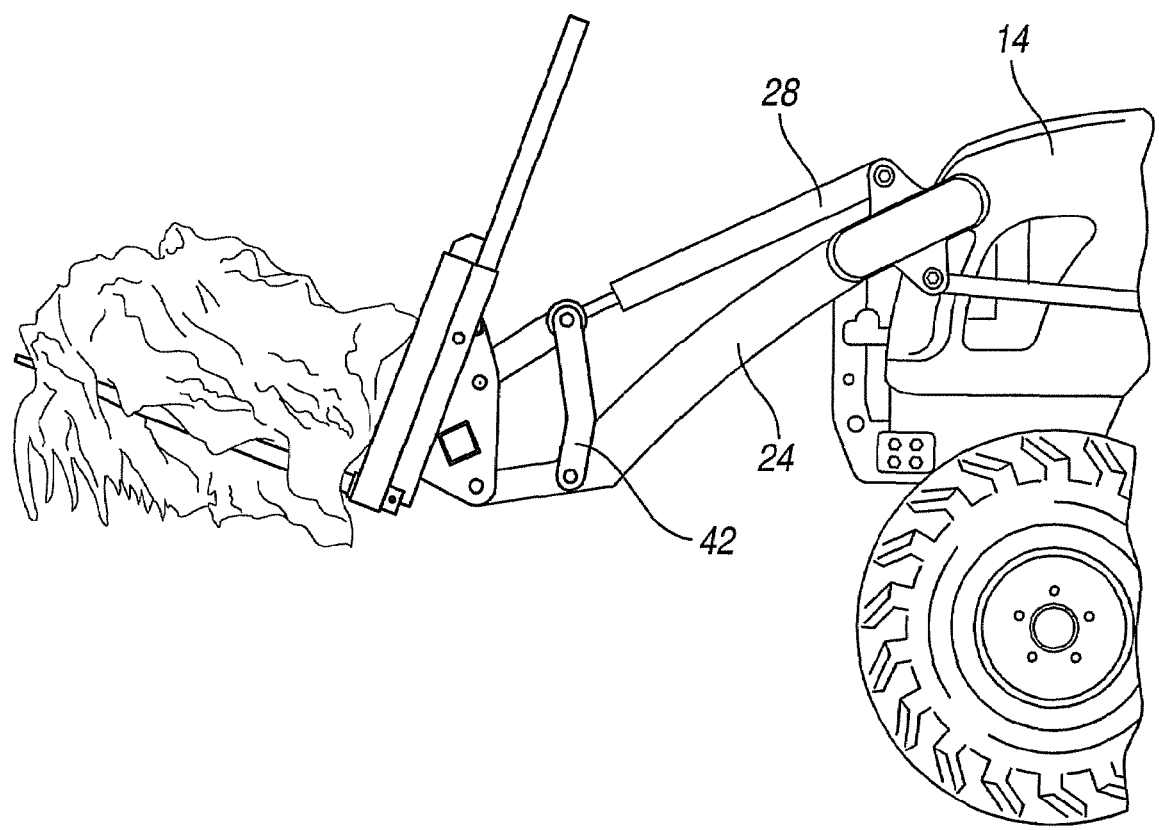
Figure 4:
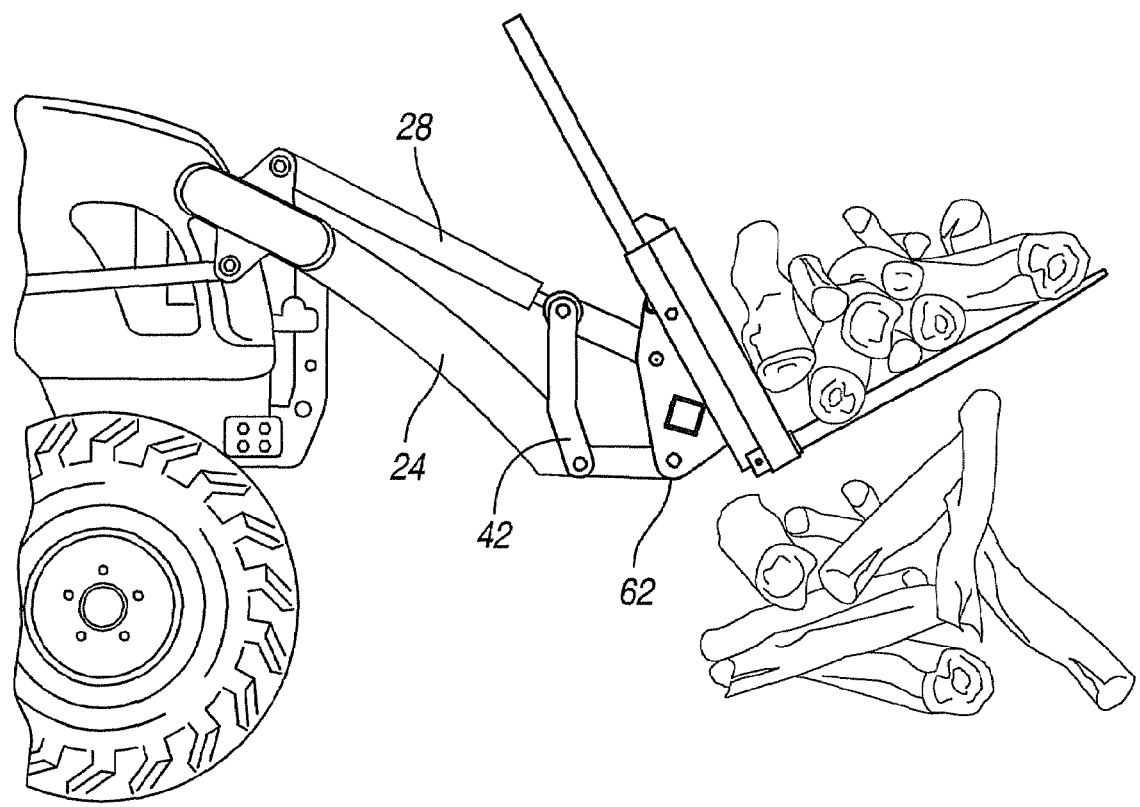
Figure 5:
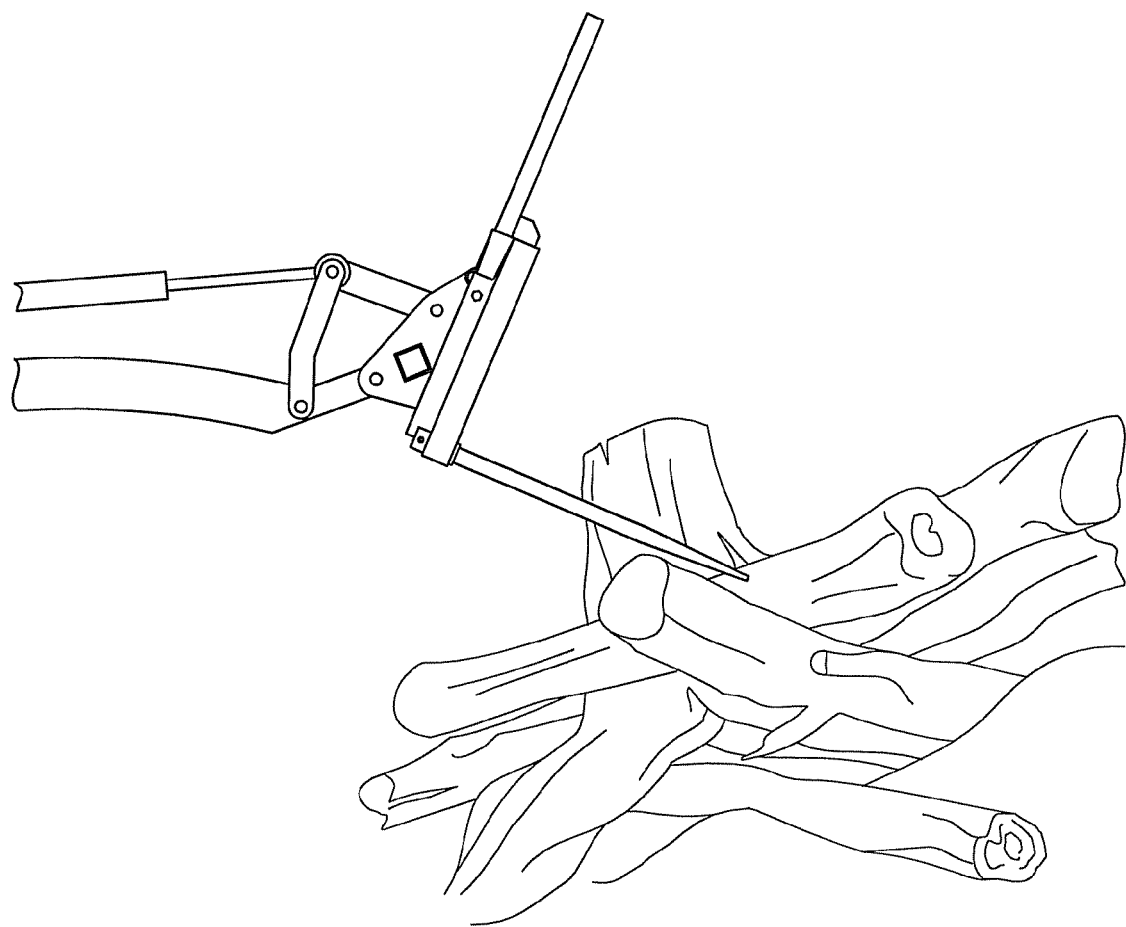

FIGS. 3-5 depict the use of the system for various tasks. The upper control link arms 28, lower control link arms 24, pivot link arms 42, and quick attach face plate assembly 62 of the tined implement 16 define a four-bar linkage, which allows for the controlled movement of the tined implement 16. In this regard, actuation of the upper actuator 30 and lower actuator allow for vertical, horizontal and rotational movement of the tined implement 16 with respect to the front-end loader 14.

Figure 6:
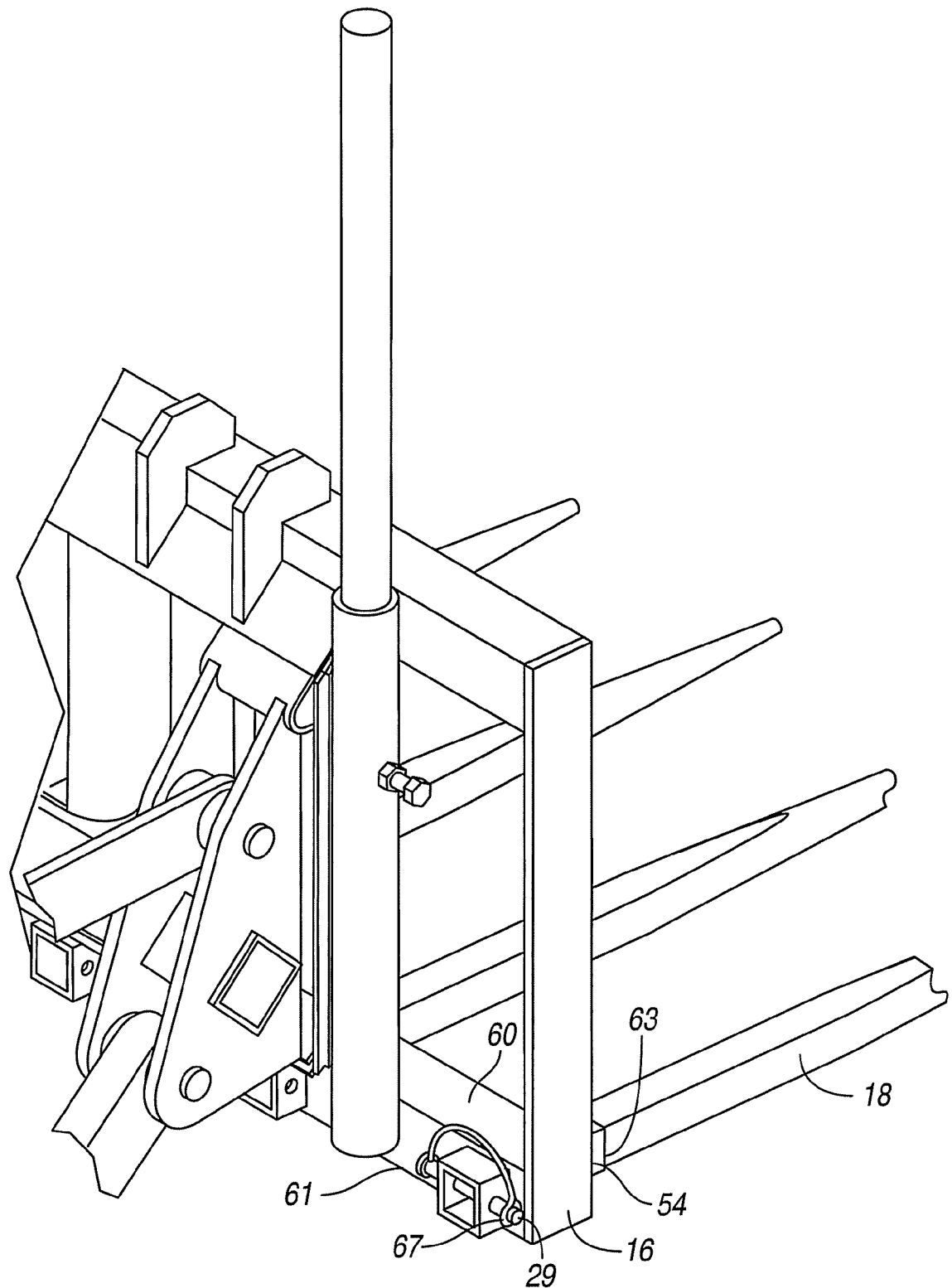
FIG. 6 is a close up perspective view of the interface between a tine and support structure.
Figure 15:
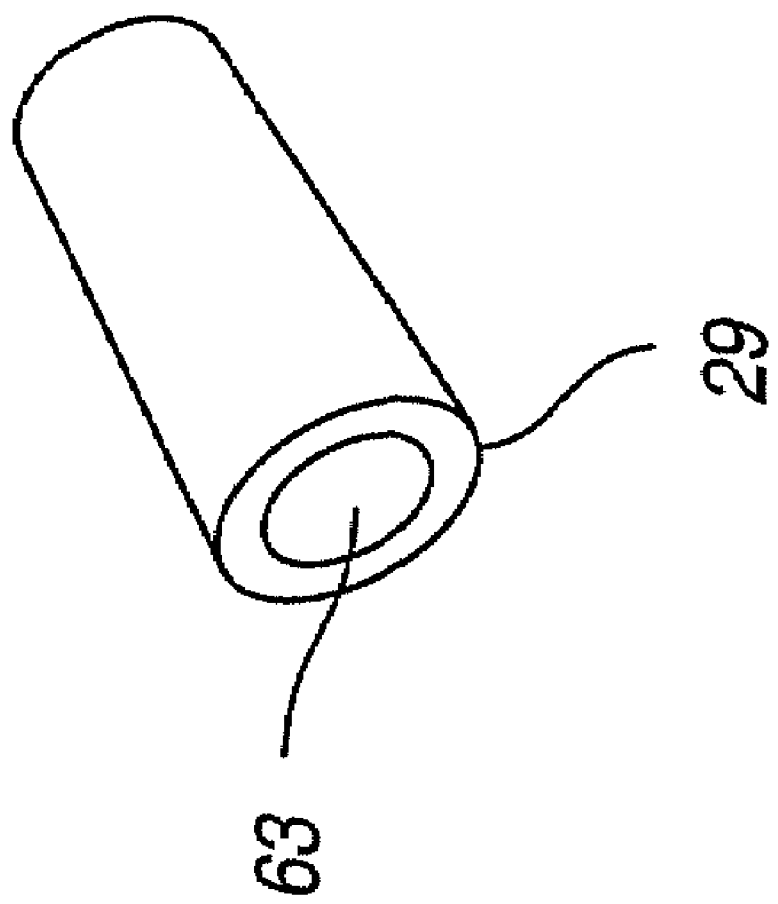
FIG. 15 represents a tine accepting bushing.

FIG. 6 is a close-up perspective view of the interface between a removable tine 18 and a support structure. In this regard, the support structure or body 54 has a lower crossbar having front and rear surfaces 60, 61. Disposed between the front and rear surfaces 60, 61 is a cylindrical bushing member 63 (see FIG. 15). The cylindrical bushing member 63 slidably accepts and supports the tine 18. A removable cross fastener 67 restricts the selective removal of the tine.

Figure 7:
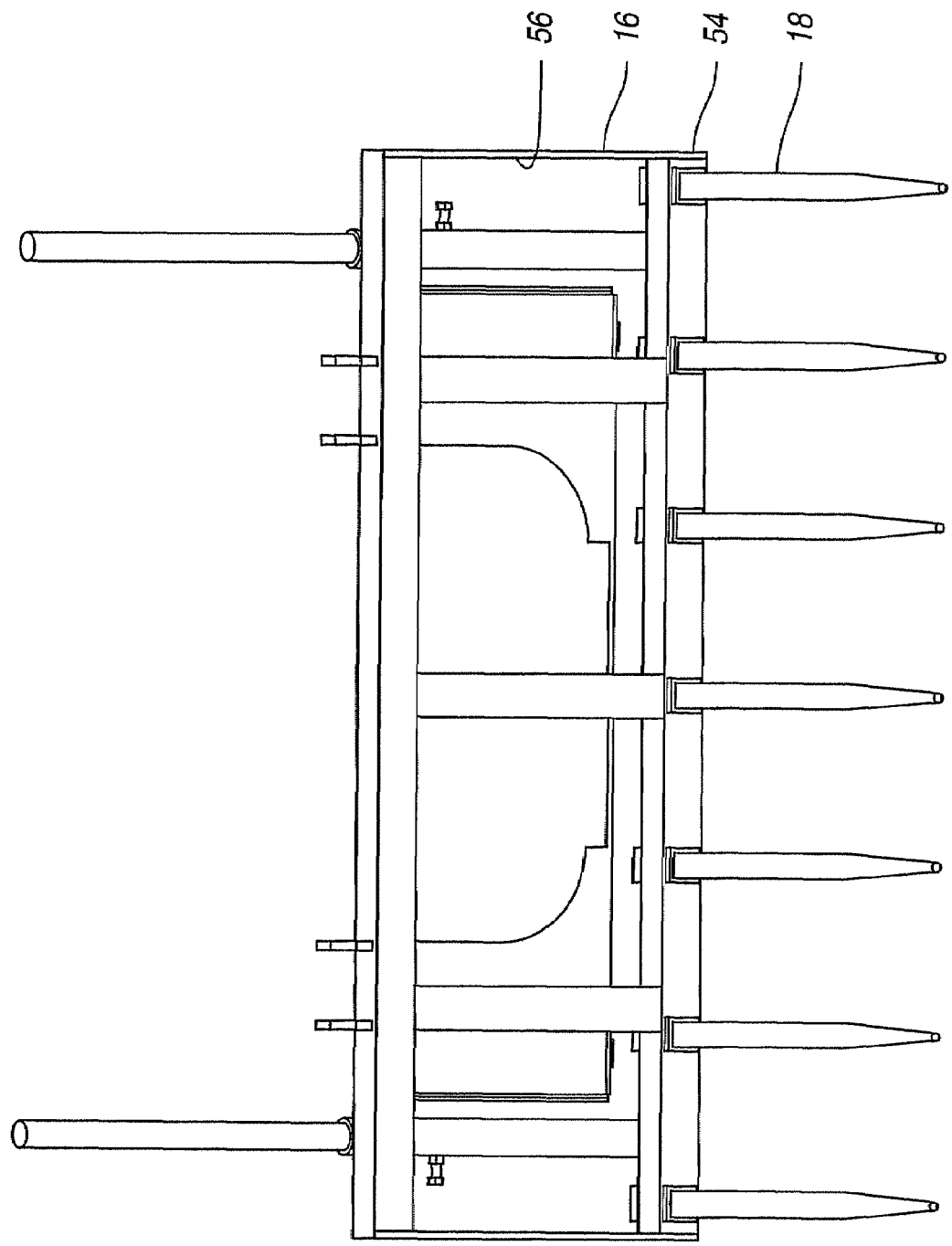
FIGS. 7-9 represent front perspective views of the mount apparatus with quick-hitch apparatus shown in FIG. 2 having various tine configurations.
Figure 8:
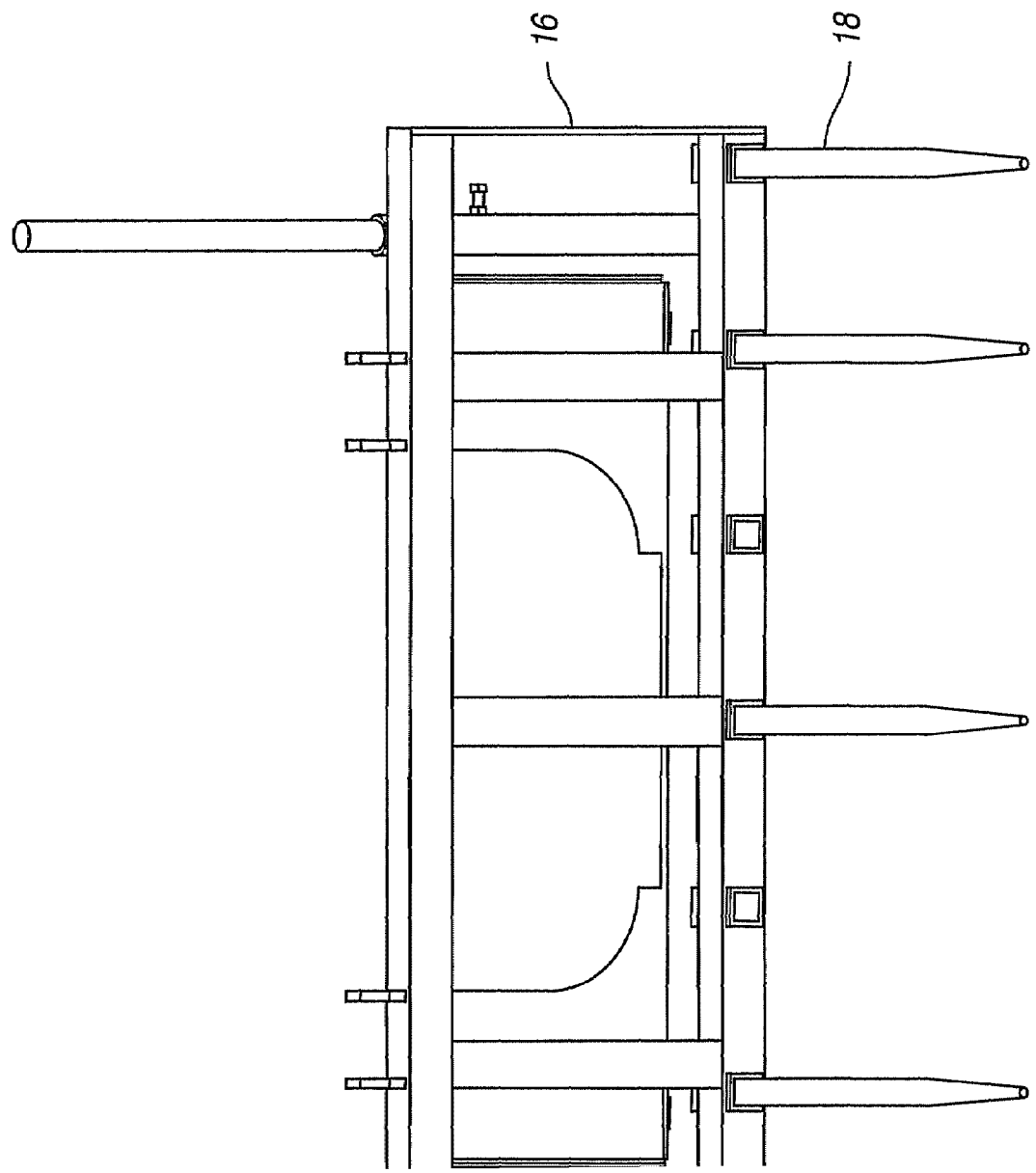
Figure 9:
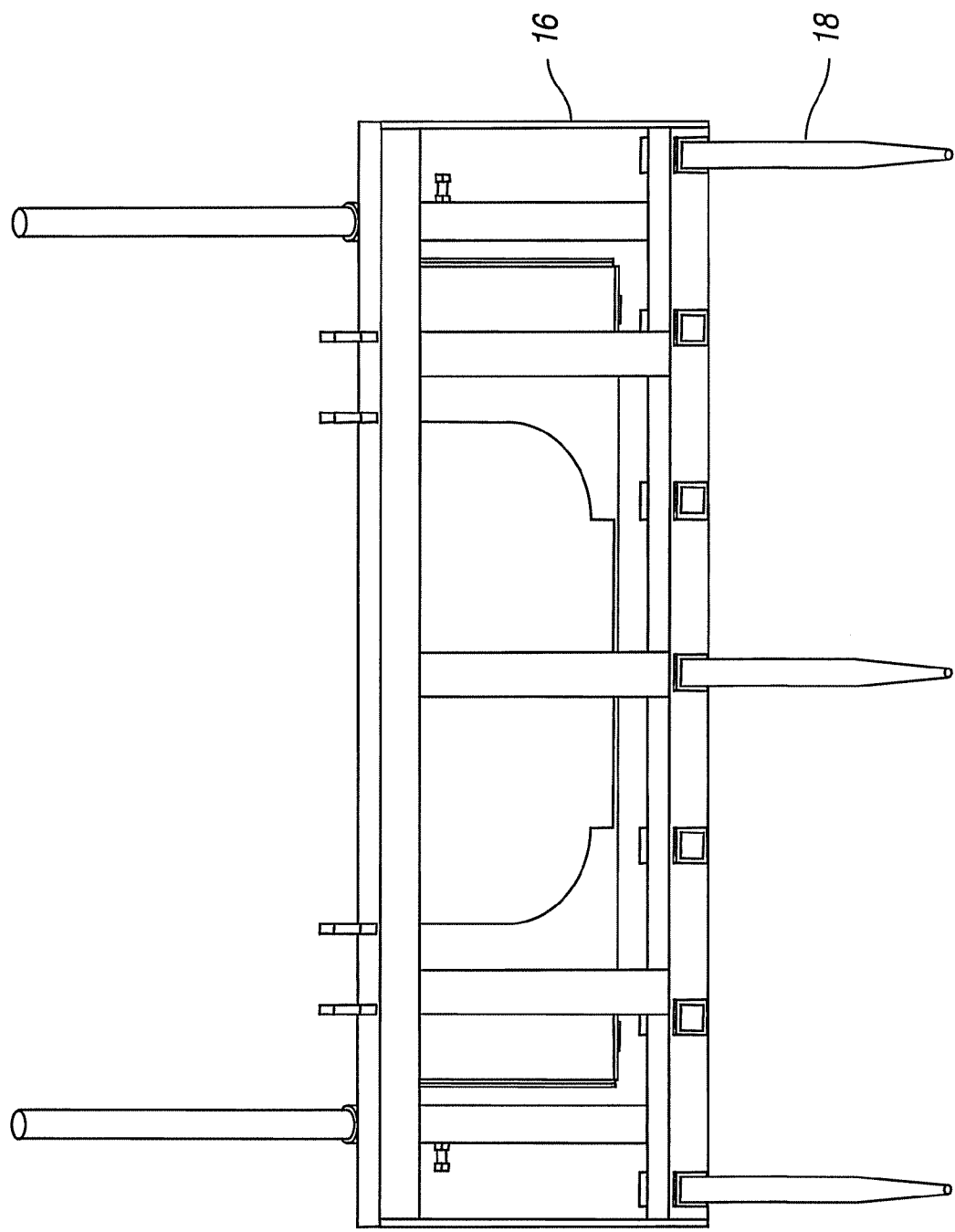

FIGS. 7-9 represent front perspective views of the implement 16 having various tine configurations. Each tine 18 is selectively removable and interchangeable within the implement 16. The re-configurable nature of the implement allows its use for various tasks such as to lift hay or switch grass bales, refuse, or skids. As can be seen, a plurality of apetures are formed along the lower edge of the implement 16. It is equally envisened an aperture or row of tine accepting apetures can be defined in a medial location of the implement, or along the top of the implement as is shown.

Figure 10:
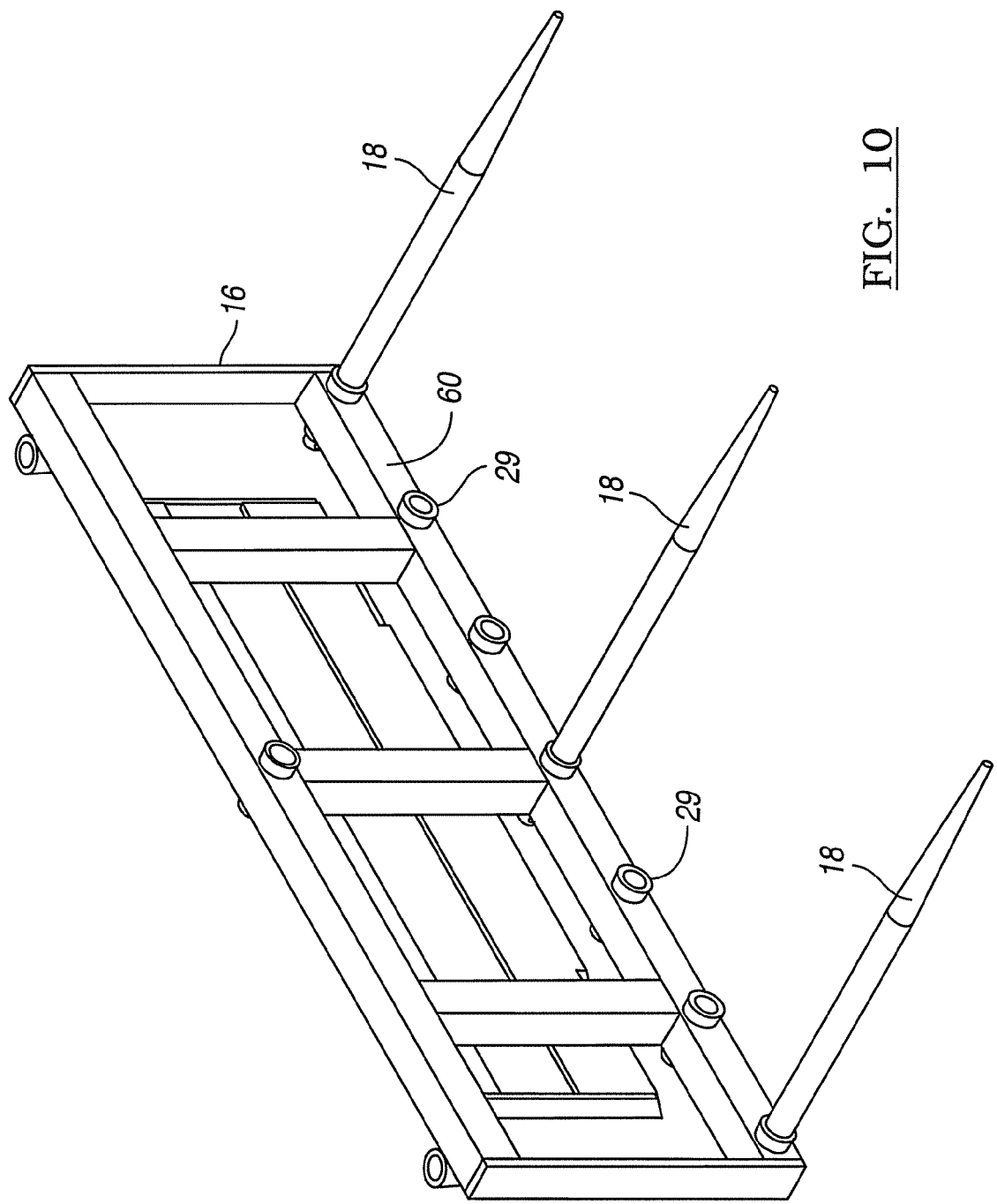
FIG. 10 represents a front perspective view of the tined implement according to a second embodiment.
Figure 11:
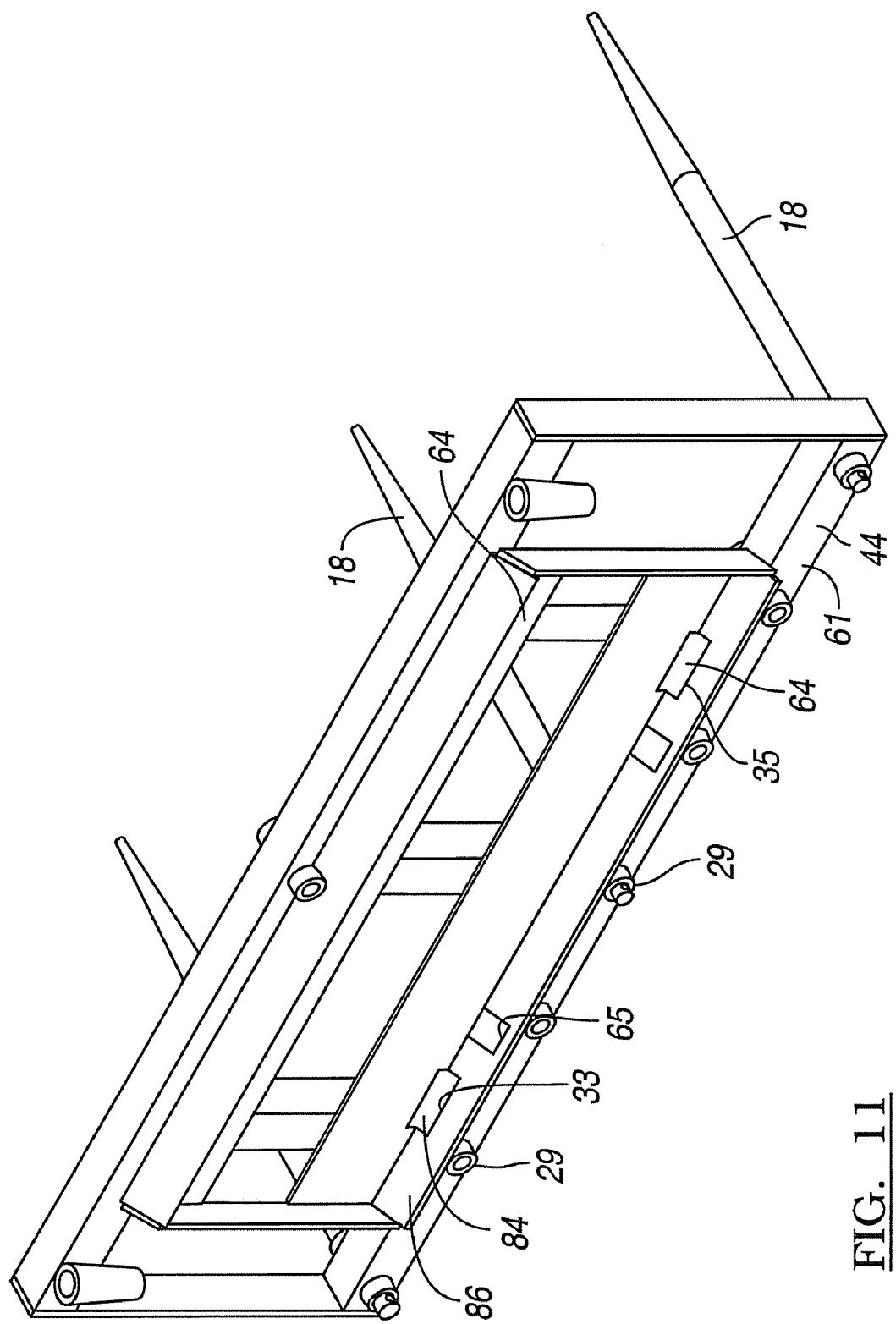
FIG. 11 represents a rear perspective view of the tined implement according to the second embodiment shown in FIG. 10.

FIGS. 10 and 11 represent front and rear perspective views of the tined implement 16. Generally, the tined implement 16 defines a plurality of apertures and bushing members 63, which slidably accept tine members 19. Depending on the desired use, all or some of the apertures can have associated tines 19. The bushings 63 define an annular support surface or bearing surface 29. The implement 16 can define a plurality of apertures along a lower surface. Additionally, the implement can define a central upper tine accepting bearing surface 29.

As seen in FIG. 11, the tined implement 16 has a rear surface 44 with three-point implement attachment points, including an upper center coupling point and a pair of lower laterally spaced coupling apertures. An opposite front surface 46 of the tined implement 16 a plurality of removable tines 18 arranged directly opposite the three-point attachment points.

The body 54 can have, by way of example and without limitations, has a pair of parallel plates spaced from one another to define a pair of laterally spaced pockets 64. The pockets 64 are spaced from one another for close receipt of the lower arms 24 and the upper control link arms 28 therein. Each plate has a pair of through openings 33 and 35 arranged for axial alignment with respective ones of the through openings in the lower arms 24 and upper control link arms 28, such that the pins 34, 38 can be disposed through the aligned openings to pivotally attach the mount apparatus 10 to the loader arm assembly 12. Disposed within the pockets 64 is coupling mechanism 65. Coupling mechanism 65 has a selectively retractable or engagable pin 80. Pin 80, which is actuated by movement of lever arm 82, is configured to engage slot 84 defined within a lower flange 86 formed in the planar body 54. Additionally, it is envisioned the tined implement 16 can have a plurality of coupling bars which will allow for the use of a three point implement attachment.

Figure 12:
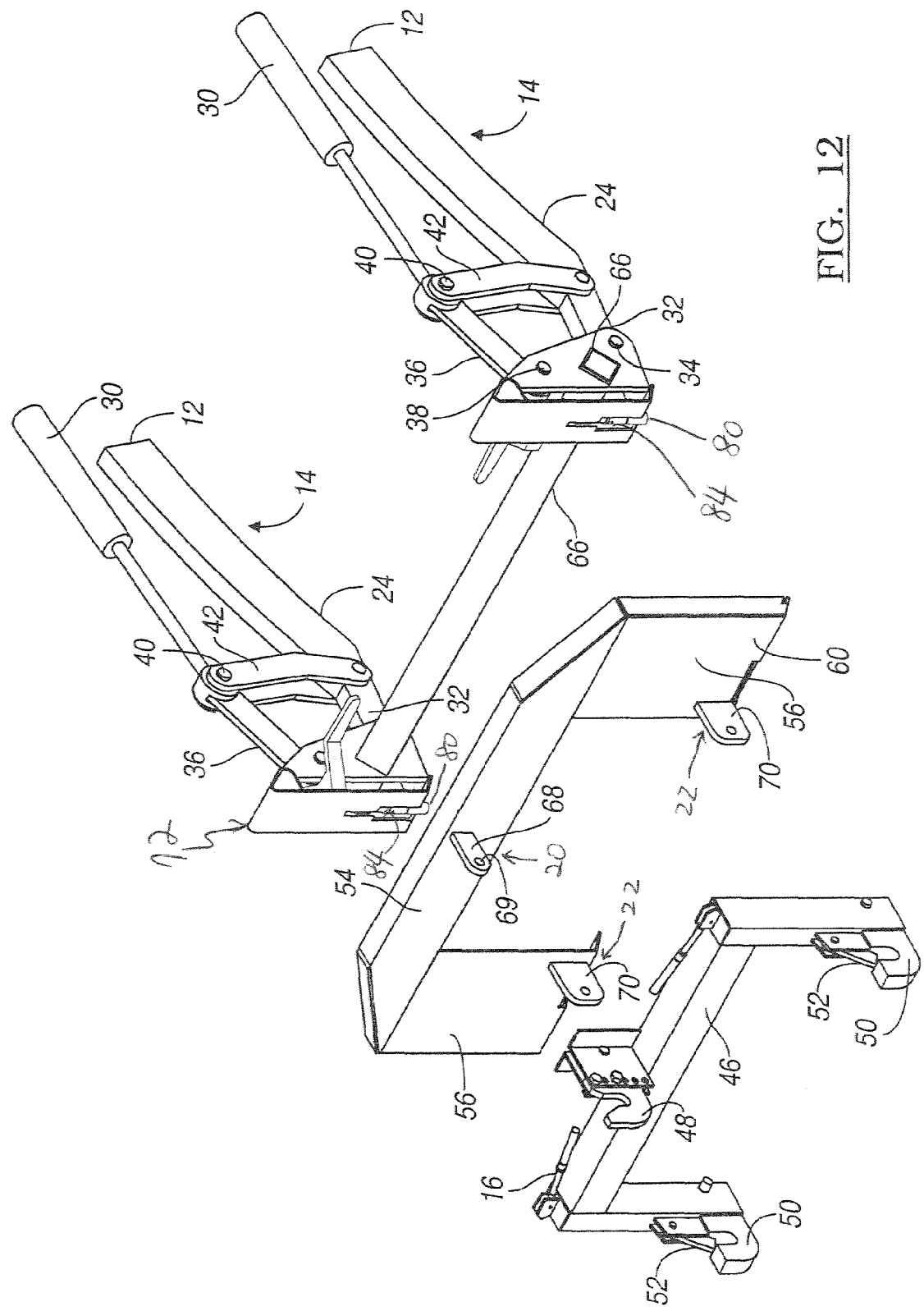
FIGS. 12 and 13 represent front and rear views of the arms of the farm equipment which are coupled to the tined implement through a mounting apparatus.
Figure 13:
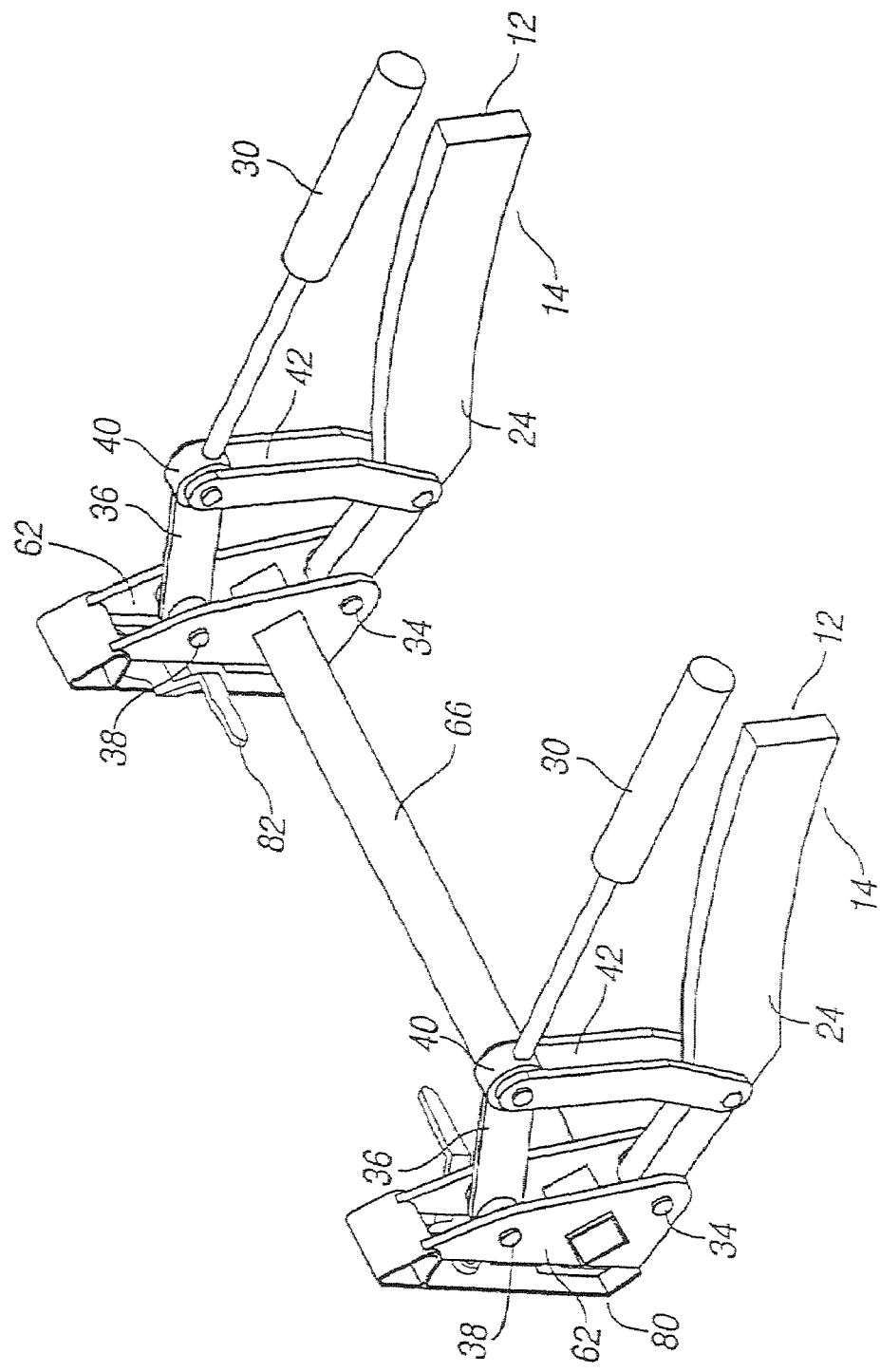

With general reference to FIGS. 12 and 13, the front-end loader arm assembly 12 is represented here, for example, as having a pair of lower arms 24 movable upwardly and downwardly via a pair of actuators (not shown), and a pair of upper control link arms 28 movable fore and aft via another pair of actuators 30. The lower arms 24 have free ends 32 with through openings adjacent thereto for pivotal attachment via pins 34 to a standard bucket (not shown), for example, which is commonly provided as original equipment on the front-end loader 14. The upper control link arms 28 have free ends 36 with through openings adjacent thereto for pivotal attachment of the bucket via pins 38 thereto. The upper control link arms 28 have opposite ends 40 attached to the actuators 30, and also arranged for operable attachment to the lower arms 24 via a pair of pivot links 42. Accordingly, the lower arms 24 provide upward and downward movement of the implement, while the upper control link arms 28 provide tilting or pivoting movement of the implement.

By functioning as an element of a four-bar linkage, the implement 16 allows for manipulations of materials held by the tines 19. By varying the location of the through openings 33 and 35 within respect to each other, adjustments of the movement and connection angle of the implement can be made. As such, it is envisioned, a plurality of holes 33 that represent mounting locations for the lower arm can be defined in the bracket. Similarly, a plurality of holes 35 can be defined in the quick attach face plate assembly 62 for facilitating coupling of the tined implement 16 to the control link arms 28.

The tined implement 16 has a generally planar body 54, represented here, for example, as having a generally inverted unshaped, with laterally spaced upright supports 56 attached to one another at an upper portion thereof via a cross support 58 extending between the upright supports 56. The body 54 has front and rear surfaces 60, 61, respectively, facing opposite directions from one another with a quick attach face plate assembly 62 extending laterally outwardly from the rear surfaces 61 of the upright supports 56. It is envisioned the planar body 54 can have an associated screen formed of expanded metal.

As seen in FIGS. 12 and 13, the quick attach face plate assembly 62 is arranged generally adjacent opposite sides of the body and is arranged for close communication with the lower arms 24 and the upper control link arms 28. The quick attach face plate assembly 62, represented here, by way of example and without limitations, has a pair of parallel plates spaced from one another to define a pair of laterally spaced pockets 64. The pockets 64 are spaced from one another for close receipt of the lower arms 24 and the upper control link arms 28 therein. Each plate has a pair of through openings 33 and 35 arranged for axial alignment with respective ones of the through openings in the lower arms 24 and upper control link arms 28, such that the pins 34, 38 can be disposed through the aligned openings to pivotally attach the tined implement 16 to the loader arm assembly 12. Disposed within the pockets 64 is coupling mechanism 65. Coupling mechanism 65 has a selectively retractable or engagable pin 80. Pin 80, which is actuated by movement of lever arm 82, is configured to engage slot 84 defined within a lower flange 86 formed in the planar body 54.

In use, the tined implement 16 is attached to the loader arm assembly 12 by axially aligning the openings in the quick attach face plate assembly 62 with the respective openings in the lower arms 24 and the control link arms 28. The pins 34, 38 are then disposed therein to maintain the quick attach face plate assembly 62 in pivotally attached relation to the loader arm assembly 12. The implement 16 is then coupled to the quick attach face plate assembly 62. Lever arms 82 are engaged so as to allow engagement of the pins 80 in the slots 84, thus locking the implement 16 to the quick attach face plate assembly 62. Upon being attached to the loader arm assembly 12, the desired implement can be attached directly to the tined implement 16 by aligning the upper center hitch point 20 and the pair of lower laterally spaced hitch points 22 of the implement with the through opening 69 in the upper bracket 68 and the through openings 71 in the lower brackets 70, respectively. Pins or carriage bolts can then be used to secure the implement directly to the tined implement 16, or the tined implement 16 can be attached to the tined implement 16, thereby allowing the desired implement to be quickly attached to the arm assembly 12 of the front-end loader 14.

The mounting apparatus 72 couples the tined implement 16 directly to the controlling arms 28 and the lower arms 24 utilizing pins 34 and 38. As described above, the quick attach face plate assembly 62 of the mounting apparatus 72 by functioning as an element of a four-bar linkage. This allows for vertical, horizontal and rotational manipulations of material held by the tined implement 16. The direct coupling of the tined implement 16 to the planar body 54 allow for a quick coupling of the mounting apparatus 72 to both loader arm assembly and to a three point implement. It is, however, envisioned the implement can be directly mounted to the control link arms 28 and lower arms 24, utilizing pins 34 and 38.

As seen in FIGS. 14*a* and 14, the tines 18 can also have an associated locking mechanism 67. This locking mechanism 67 can take the form of a selectively lockable removable pin which functions to engage or disengage an aperture 52 within the tines 18. The tines 18 have a coupling four degree bearing tapered surface 66 which interacts with a similarly tapered interior surface of the bushing member 63 (see FIG. 15).

The embodiments of the tined implement and associated transporting vehicle 14 discussed above are intended to be illustrative of presently preferred embodiments, and not limiting. Various modifications within the spirit and scope of the invention will be readily apparent to those skilled in the art.

What is claimed is:

1. A tined implement coupled to front arms of a front-end loader, said implement comprising:
    a hitch quick-coupler mechanism;
    a body coupled to the quick-coupler mechanism, said body defining a plurality of apertures;
    a plurality of bushings disposed within the apertures and each having a tapering tine bearing surface;
    at least one tine having a tapering exterior surface, said at least one tine removably coupled to the body and positioned within one of said tapering tine bearing surfaces of said bushings with said tapering exterior surface engaged with said tapering tine bearing surface; and
    a plurality of arm coupling brackets coupled to the quick-coupler mechanism, said brackets being rotatably coupled to the front arms of the front-end loader.

2. The implement according to claim 1 wherein said body comprises a plurality of coupling flanges disposed between the body and the quick-coupler mechanism.

3. The implement according to claim 1 wherein the front arms comprise top and bottom linkages, said arm coupling brackets coupled to the top and bottom linkages to form a four-bar linkage.

4. The implement according to claim 1 wherein the arm coupling brackets extend generally perpendicular to a rear surface of said body, each flange having a pair of openings adapted for pivotal attachment to the front arms of the front-end loader.

5. An implement according to claim 1 further comprising an upper bracket extending laterally from the body, said upper bracket being adapted to be coupled to a center hitch point of said quick-coupler mechanism.

6. The implement according to claim 1 wherein said quick-coupler mechanism comprises a pair of lower hooks each having a releasable locking mechanism.

7. The implement according to claim 6 further comprising an upper hook displaced relative to, but disposed between said pair of lower hooks.

8. A tined implement assembly attached to front arms of a front-end loader, said tined implement assembly comprising:
    a generally planar body defining a plurality of tine accepting bearing surfaces; and
    a plurality of tines selectively and removably positioned within the plurality of tine accepting bearing surfaces,
    wherein the body defines a pair of lower coupling mechanisms and an upper coupling mechanism each configured to couple the body to the arms of the front-end loader, the front arms each comprise top and bottom linkages, said upper and lower coupling mechanisms being rotatably coupled to the top and bottom linkages and further comprising a pivot link coupled to the top and bottom linkages to define a four-bar linkage.

9. The tined implement assembly according to claim 8 wherein the body comprises a pair of laterally spaced supports and a cross support extending there between.

10. The tined implement assembly according to claim 8 wherein the tine accepting bearing surface is a tapered surface.

11. The tined implement assembly according to claim 8 further comprising a quick-coupler mechanism coupled to upper and lower coupling mechanism.

12. The tined implement assembly according to claim 8 further comprising a first actuator coupled to the lower linkage and a second actuator coupled to the upper linkage.

13. A method of attaching a tined hitch implement to a front end of a front-end loader, the front end having a pair of front loader arms and a pair of control link arms, said method comprising the steps of:
    attaching a body for pivotal movement to said control link arms and said front loader arms, said body defining a plurality of tapered tine bearing apertures; and
    selectively and removably attaching at least one tine to the body and within the tapered tine bearing apertures.

14. The method according to claim 13 further comprising attaching a three-point quick-hitch apparatus to a plurality of brackets on the body.

15. The method according to claim 14 wherein attaching said three-point hitch apparatus to said body is coupling said three-point hitch apparatus to a plurality of hooks disposed on said body.

16. The method according to claim 13 wherein attaching a body is axially aligning openings in flanges on the body with respective openings in the lower arms and control link arms.

17. The method according to claim 16 further including disposing pins within the aligned openings to maintain the body in pivotal attachment with said loader arms.

* * * * *